3,022,253
RESINOUS INSOLUBLE NITROGEN-CONTAINING POLYMERS DERIVED FROM VINYLBENZYL CHLORIDE AND VINYLPYRIDINES
Elmer L. McMaster, Midland, Mich., assignor to The Dow Chemical Company, Midland, Mich., a corporation of Delaware
No Drawing. Filed Mar. 24, 1958, Ser. No. 723,134
16 Claims. (Cl. 260—2.1)

This invention concerns certain new resinous insoluble nitrogen-containing polymers of vinylbenzyl chloride and a vinylpyridine and aminated derivatives thereof. It relates more particularly to insoluble copolymers of vinylbenzyl chloride and vinylpyridines and to aminated derivatives of the copolymers, and pertains to a method of making the same.

The polymers of the invention are insoluble cross-linked copolymers of vinylbenzyl chloride and a vinyl-substituted heterocyclic amine, e.g. a vinylpyridine, having the general formula:

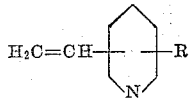

wherein R is a member of the group consisting of hydrogen and the methyl and ethyl radicals. The polymers contain pyridinium groups having a replaceable anion such as a chloride, sulfate or hydroxyl ion attached to the pentavalent nitrogen atom in the polymer molecule. In addition to pyridinium groups the polymers contain chloromethyl groups on aromatic nuclei of the copolymer molecule, which chlorine atom in the chloromethyl group can be reacted with a nitrogen-containing base such as ammonia, primary-, secondary- or tertiary amines to introduce polar groups, e.g. primary-, secondary- or tertiary amino groups or quaternary ammonium groups into the polymer molecule. The aminated polymers containing pyridinium groups and primary-, secondary- or tertiary amino groups or quaternary ammonium groups possess ion exchange properties and are suitable for removing anions from fluids.

The polymers are all insoluble in organic liquids such as ethyl alcohol, acetone, benzene, toluene, chlorobenzene, ethylene dichloride, perchloroethylene, methylene dichloride, tetrachloroethane, carbon tetrachloride, or in water or aqueous solutions of acids or alkalies, e.g. an aqueous 10 weight percent solution of sodium hydroxide, hydrochloric acid or sulfuric acid.

The aminated polymers are prepared by a series of steps. An insoluble copolymer is first prepared by polymerizing from 50 to 95 percent, on a molar basis, of a vinylbenzyl chloride, i.e. ortho-, meta-, or para-vinylbenzyl chloride, or a mixture of the isomers, with from 50 to 5 molar percent of a vinylpyridine having the aforementioned general formula to obtain a resinous insoluble cross-linked copolymer containing pyridinium groups, and chloromethyl groups on aromatic nuclei of the polymer molecules. The copolymer is then reacted with a nitrogen-containing base such as ammonia, a primary-, secondary- or tertiary amine, preferably a tertiary amine, whereby is obtained an insoluble cross-linked polymeric amine salt or a quaternary ammonium salt. A final washing with an alkaline material such as an aqueous solution of sodium hydroxide converts the salt into the free amine or quaternary ammonium hydroxide.

The final product, e.g. the polymeric free amine containing pyridinium groups, is capable of absorbing anions from fluids as is the polymeric quaternary ammonium hydroxide. In this connection, it may be mentioned that the copolymers of the vinylbenzyl chloride and vinylpyridine, containing chloromethyl groups and pyridinium groups in the polymer molecules also possess ion exchange properties and can be employed to absorb anions from fluids.

In preparing the insoluble copolymers a predominant amount, e.g. from 50 to 95 percent on a molar basis, of the vinylbenzyl chloride is employed. That is at least half, preferably from 75 to 95 percent on a molar basis of the starting material is vinylbenzyl chloride and not more than half, suitably from 25 to 5 mole percent of said material is a vinylpyridine having the aforementioned general formula. The vinylpyridine in combination with the vinylbenzyl chloride has a cross-linking action which imparts insolubility, complexity and hardness to the copolymer. The vinylpyridine also provides pyridinium groups in the polymer molecules which groups are capable of absorbing or exchanging ions. As the amount of the vinylpyridine is increased, the resultant product becomes increasingly dense and contains more pyridinium groups, but for most purposes best results are usually obtained when the copolymers contain from 5 to 25 mole percent of a vinylpyridine chemically combined with from 95 to 75 mole percent of vinylbenzyl chloride in the polymeric product.

The insoluble copolymers of the vinylbenzyl chloride and vinylpyridines can be prepared in usual ways for making polystyrene, e.g. a mixture of the monomers can be polymerized in mass or while suspended in a non-solvent for the monomers such as water or brine, while being heated at polymerization temperatures with or without agitation at temperatures between 50° and 150° C.

The polymerization of the vinyl compounds is accelerated by means of catalysts which provide oxygen. Suitable catalysts include ozone, peroxides such as lauroyl peroxide, benzoyl peroxide, tert.-butyl hydroperoxide, di-tert.-butyl peroxide, cumene hydroperoxide, di-tert.-butyl diperphthalate, tert.-butyl perbenzoate, di-isopropylbenzene hydroperoxide, or potassium persulfate and the like. The catalysts are employed in suitable amounts of from 0.1 to about 2 percent based on the monomeric material to be polymerized.

The polymer, if not in bead or granular form, is ground to particles of sizes between about 4 and 325 mesh per inch and screened to obtain a fraction of the polymer having particles of substantially the same size, e.g. particles of sizes between 20 and 50 mesh per inch or 50 to 80 mesh per inch, as determined by U.S. Standard screens.

The aminated copolymers are prepared by reacting the insoluble cross-linked copolymers of vinylbenzyl chloride and vinylpyridines with a nitrogen-containing base such as ammonia, a primary-, secondary- or tertiary amine, whereby the chlorine atom on chloromethyl radicals in the polymer molecule is replaced by a nitrogen atom of the nitrogen-containing base to form a corresponding primary- secondary- or tertiary amine group or a quaternary ammonium group. The reaction is preferably carried out by suspending particles of the insoluble copolymer in a liquid which is a solvent for the amine. Examples of suitable liquids are water, acetone, alcohol, etc. The mixture may be allowed to react at room temperature, or preferably at elevated temperatures, suitably at temperatures between 20° and 120° C., and at atmospheric or superatmospheric pressure, after which the aminated polymer is separated from the liquid.

The nitrogen-containing base to be employed in the reaction can be ammonia or an amine. Examples of suitable amines are methylamine, ethylamine, butylamine, hexylamine, dimethylamine, diethylamine, dipropylamine, ethylenediamine, diethylenetriamine, trimethylamine, triethylamine, tributylamine, dimethylethanolamine, dimethylisopropanolamine, cyclohexylamine, benzylamine, aniline, dimethylaniline, quinoline, pyridine and the like.

The following examples illustrate ways in which the principle of the invention has been applied, but are not to be construed as limiting its scope.

EXAMPLE 1

A charge of 24 grams (0.157 mole) of vinylbenzyl chloride (95 percent purity) and 4 grams (0.039 mole) of 2-vinylpyridine, together with 0.14 gram of lauroyl peroxide and 0.028 gram of benzoyl peroxide as polymerization catalysts, were sealed in a stoppered glass bottle. The mixture was agitated at room temperature for 4 hours. A viscous solution was obtained. The bottle and contents were heated in an oven at a temperature of 100° C. for 4 hours without agitation to complete the polymerization. Thereafter, the bottle was broken and the polymer removed. The polymer was a hard brittle solid. It was ground to a granular form and analyzed. The polymer contained 18.7 percent by weight of chlorine, and was insoluble in toluene, ethylene dichloride or acetone.

EXAMPLE 2

A portion corresponding to 4.2 ml. of the granular copolymer prepared in Example 1 was swelled in methylene chloride, then was drained from the liquid and mixed with 50 ml. of an aqueous 25 weight percent solution of trimethylamine. The mixture was stirred and heated at a temperature of 40° C. for 4 hours. Thereafter, the copolymer granules were separated from the liquid by filtering and were washed with water. The aminated copolymer product was an anion exchange resin. It had an anion exchange capacity corresponding to 27.1 kilograins of calcium carbonate per cubic foot of a bed of the water-swollen resin.

EXAMPLE 3

In each of a series of experiments a charge of 25 grams of a mixture of vinylbenzyl chloride and 2-vinylpyridine in proportions as stated in the following table, together with 0.13 gram of benzoyl peroxide as polymerization catalyst was sealed in a glass ampoule and polymerized by heating the same at a temperature of 50° C. for 4 hours while agitating, then heating at a temperature of 80° C. for 24 hours without agitating. Thereafter, the ampoules were broken and the polymer removed. The polymer was ground to a granular form, i.e. particles of sizes between 20 and 100 mesh per inch as determined by U.S. Standard screens, and was analyzed for chlorine. All of the copolymers were insoluble in water, acetone, toluene, ethylene dichloride, or methylene chloride. A portion, 5 grams, of each copolymer was swelled in methylene chloride, drained free of excess liquid and mixed with 100 ml. of an aqueous 50 weight percent solution of dimethylethanolamine. The mixture was heated at a temperature of between 90° and 100° C. for 4 hours, then was cooled. The aminated copolymer was separated from the liquid and was reacted with water. The aminated products were insoluble in water and aqueous solutions of acids and bases, e.g. an aqueous 10 weight percent solution of sodium hydroxide or sulfuric acid. The products were anion exchange resins. The anion exchange capacity was determined for the resin and is reported in the following table. Table I identifies the copolymers by giving the weight in grams of the monomers employed in making the same. The table gives the percent by weight of total chlorine and ionic chlorine in the copolymer and gives an anion exchange capacity for the aminated copolymer or final product expressed as kilograins of calcium carbonate per cubic foot of a bed of the water-swelled resin granules.

Table I

| Run No. | Starting Materials | | Copolymer | | Aminated Copolymer |
|---|---|---|---|---|---|
| | Vinylbenzyl chloride, gms. | 2-Vinyl pyridine, gms. | Total chlorine, percent | Ionic chlorine, percent | Capacity kilograins CaCO₃/ cu. ft. |
| 1 | 24.87 | 0.13 | 22.8 | 0.0 | |
| 2 | 23.5 | 1.5 | 21.3 | 0.0 | 8.6 |
| 3 | 22.5 | 2.5 | 19.88 | 1.13 | 15.4 |
| 4 | 20.0 | 5.0 | 18.20 | 4.9 | 17.0 |
| 5 | 17.5 | 7.5 | 14.60 | 7.3 | 23.0 |
| 6 | 15 | 10 | 14.1 | 9.24 | 21.4 |
| 7 | 12.5 | 12.5 | 11.87 | 9.7 | 14.2 |

EXAMPLE 4

(A) A charge of 17.5 grams of a mixture of chloromethyl styrenes (70 percent by weight of para-(chloromethyl)styrene and 30 percent of ortho-(chloromethyl)styrene) and 7.5 grams of 2-vinyl-5-ethylpyridine, together with 0.13 gram of benzoyl peroxide as polymerization catalyst, was sealed in a glass bottle. The mixture was agitated and heated at a temperature of 50° C. for a period of 4 hours, to polymerize the monomers. The product was removed from the bottle and ground to a granular form of sizes not greater than 20 mesh per inch as determined by U.S. Standard screens. The product was insoluble in toluene and contained 14.97 percent by weight of chlorine by analysis.

(B) A charge of 3.6 grams of the granular copolymer prepared in part A above and 30 ml. of an aqueous 50 weight percent solution of dimethylethanolamine was placed in a glass reaction vessel equipped with a reflux condenser and stirrer. The mixture was stirred and heated at temperatures between 90° and 100° C. for a period of 4 hours. Thereafter the insoluble polymer was separated by filtering and was washed with water. The aminated product was an anion exchange resin. It had an anion exchange capacity corresponding to 17 kilograins of calcium carbonate per cubic foot of a bed of the water-swollen resin.

EXAMPLE 5

(A) A charge of 17.5 grams of (chloromethyl)-styrenes similar to that employed in Example 4 and 7.5 grams of 4-vinylpyridine together with 0.13 gram of benzoyl peroxide as polymerization catalyst, was polymerized by procedure similar to that employed in part A of Example 4. The copolymer was insoluble in toluene and contained 13.6 percent by weight of chlorine.

(B) A charge of 2.6 grams of the polymer was aminated by reacting the same with dimethylethanolamine employing the procedure similar to that employed in part B of Example 4. The aminated polymer product was suitable for removing anions from fluids, e.g. an aqueous solution of sodium hydroxide, and had a capacity corresponding to 17 kilograins of calcium carbonate per cubic foot of a bed of the water swollen resin granules.

EXAMPLE 6

(A) A charge of 20 grams of (chloromethyl)styrenes similar to that employed in Example 4, and 5 grams of 2-methyl-5-vinylpyridine, together with 0.07 gram of lauroyl peroxide and 0.07 gram of benzoyl peroxide, was sealed in a glass bottle and polymerized by heating the same at a temperature of 50° C. for 4 hours, then at 110° C. for 1 hour. The product was a hard solid and was insoluble in toluene. It was ground to a granular form (20 mesh per inch screen) and analyzed. It contained 17.28 percent by weight of chlorine.

(B) A charge of 3.5 grams of the granular copolymer prepared in part A above was suspended in 30 ml. of 50 weight percent aqueous dimethylethanolamine solution and the mixture heated at temperatures between 90° and 100° C. for a period of 4 hours. Thereafter, the aminated polymer was separated by filtering and was washed with water. The product was an anion exchange resin. It had a capacity corresponding to 29 kilograins of calcium carbonate per cubic foot of a bed of the water-swollen resin granules.

EXAMPLE 7

A mixture of 40 grams of (chloromethyl)styrene similar to that employed in Example 4 and 10 grams of 2-vinylpyridine together with 0.5 gram of benzoyl peroxide dissolved in the monomers, was suspended in 800 ml. of a saturated aqueous solution of sodium chloride at room temperature, containing 1 percent by weight of methyl cellulose (1500 cps.). The mixture was stirred and heated at temperatures between 80° and 90° C. for a period of 12 hours. The monomers were polymerized in the form of hard rounded granules or beads. The product was separated and was washed with water and dried. The copolymer was insoluble in toluene. It contained 14.25 percent by weight of chlorine.

A charge of 5 grams of the copolymer beads was suspended in 40 ml. of a 50 weight percent aqueous solution of dimethyl ethanolamine. The mixture was heated with stirring at temperatures between 90° and 95° C. for a period of 4 hours. Thereafter, the aminated copolymer beads were separated and washed with water. The aminated beads swelled in water and had a volume of 20 ml. The product was capable of absorbing anions from aqueous solution, e.g. hydroxyl ions from an aqueous solution of sodium hydroxide. The product had an anion exchange capacity corresponding to 19.3 kilograins of calcium carbonate per cubic foot of a bed of the water-swollen polymer granules.

I claim:

1. A polymeric composition which comprises an insoluble cross-linked polymeric product, containing pyridinium groups in the polymer molecules, selected from the group consisting of (A) polymers resulting from the simultaneous copolymerization and reaction of from 50 to 95 mole percent of vinylbenzyl chloride and correspondingly from 50 to 5 mole percent of a vinyl-substituted heterocyclic amine having the general formula:

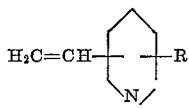

wherein R is a member of the group consisting of hydrogen and the methyl and ethyl radicals, said polymers containing chloromethyl groups on aromatic nuclei in the polymer molecules, and (B) the aminated polymers resulting from the reaction of the (A) polymers with a nitrogen-containing base selected from the group consisting of ammonia and amines.

2. A polymeric composition comprising an insoluble cross-linked polymeric product containing pyridinium groups in the polymer molecules and resulting from the simultaneous copolymerization and reaction of a mixture of from 50 to 95 mole percent of vinylbenzyl chloride and from 50 to 5 mole percent of a vinyl-substituted heterocyclic amine having the general formula:

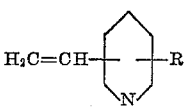

wherein R is a member of the group consisting of hydrogen and the methyl and ethyl radicals, said polymeric product having chloromethyl groups on aromatic nuclei in the polymer molecules.

3. A composition as claimed in claim 2, wherein the vinyl-substituted heterocyclic amine is vinylpyridine.

4. A composition as claimed in claim 2, wherein the vinyl-substituted heterocyclic amine is 2-methyl-5-vinylpyridine.

5. A composition as claimed in claim 2, wherein the vinyl-substituted heterocyclic amine is 2-ethyl-5-vinylpyridine.

6. A polymeric composition which comprises the reaction product of (1) an insoluble cross-linked polymeric product containing pyridinium groups in the polymer molecules and resulting from the simultaneous copolymerization and reaction of a mixture of from 50 to 95 mole percent of vinylbenzyl chloride and from 50 to 5 mole percent of a vinyl-substituted heterocyclic amine having the general formula:

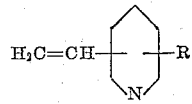

wherein R is a member of the group consisting of hydrogen and the methyl and ethyl radicals, said (1) polymeric product having chloromethyl groups on aromatic nuclei in the polymer molecules, and (2) a nitrogen-containing base selected from the group consisting of ammonia and amines.

7. A composition as claimed in claim 6, wherein the nitrogen-containing base is a tertiary amine.

8. A composition as claimed in claim 7, wherein the nitrogen-containing base is trimethylamine.

9. A composition as claimed in claim 7, wherein the nitrogen-containing base is dimethylethanolamine.

10. A composition as claimed in claim 6, wherein the nitrogen-containing base is diethylenetriamine.

11. A process for making an insoluble cross-linked polymeric composition containing pyridinium groups in the polymer molecules, which process comprises polymerizing a mixture of monomers consisting essentially of from 50 to 95 mole percent of vinylbenzyl chloride and from 50 to 5 mole percent of a vinyl-substituted heterocyclic amine having the general formula:

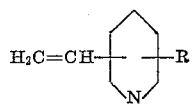

wherein R is a member of the group consisting of hydrogen and the methyl and ethyl radicals by heating a mixture of said monomers at temperatures between 50° and 150° C. in contact with a peroxy polymerization catalyst, said polymer containing chloromethyl groups on aromatic nuclei of the polymer molecules.

12. A process for making an insoluble cross-linked polymeric composition containing pyridinium groups in the polymer molecule, which process comprises polymerizing a mixture of monomers consisting essentially of from 50 to 95 mole percent of vinylbenzyl chloride and from 50 to 5 mole percent of a vinyl-substituted heterocyclic amine having the general formula:

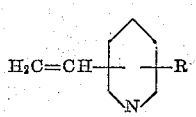

wherein R is a member of the group consisting of hydrogen and the methyl and ethyl radicals by heating a mixture of said monomers at temperatures between 50° and 150° C. in contact with a peroxy polymerization, thereby forming a cross-linked copolymer containing pyridinium groups and having chloromethyl groups attached to aromatic nuclei in the polymer molecules, and reacting the chloromethyl groups in particles of the insoluble copolymer with a nitrogen-containing base selected from the group consisting of ammonia and amines at temperatures between 20° and 120° C. while having said copolymer particles in contact with said nitrogen-containing base.

13. A process as claimed in claim 12, wherein the nitrogen-containing base is a tertiary amine.

14. A process as claimed in claim 12, wherein the nitrogen-containing base is trimethylamine.

15. A process as claimed in claim 12, wherein the nitrogen-containing base is dimethylethanolamine.

16. A process as claimed in claim 12, wherein the nitrogen-containing base is diethylenetriamine.

References Cited in the file of this patent
UNITED STATES PATENTS

| | | |
|---|---|---|
| 2,670,334 | D'Alelio | Feb. 23, 1954 |
| 2,780,604 | Clarke et al. | Feb. 5, 1957 |
| 2,788,330 | Gilwood et al. | Apr. 9, 1957 |
| 2,828,270 | Murata | Mar. 25, 1958 |
| 2,860,096 | Juda et al. | Nov. 11, 1958 |